(12) United States Patent
Lucht

(10) Patent No.: US 7,128,494 B2
(45) Date of Patent: Oct. 31, 2006

(54) METHOD AND APPARATUS FOR SECURING A CASTER WHEEL

(75) Inventor: Wayne Lucht, Bedford Park, IL (US)

(73) Assignee: Midway Displays, Inc., Bedford Park, IL (US)

( * ) Notice: Subject to any disclaimer, the term of this patent is extended or adjusted under 35 U.S.C. 154(b) by 0 days.

(21) Appl. No.: 10/299,735

(22) Filed: Nov. 19, 2002

(65) Prior Publication Data

US 2004/0093688 A1     May 20, 2004

(51) Int. Cl.
*A47C 7/00* (2006.01)
*B60B 33/00* (2006.01)

(52) U.S. Cl. ............... 403/408.1; 403/244; 403/317; 248/188.1; 248/188.7

(58) Field of Classification Search .......... 403/274, 403/244, 408.1, 317, 282, 260; 29/432.2; 248/346.11, 903, 188.1, 188.7, 129; 72/370.27, 72/358; 138/109; 16/29, 31 R, 37–39, 45, 16/42 R, 30, 31 A, 18 R
See application file for complete search history.

(56) References Cited

U.S. PATENT DOCUMENTS

| | | | | |
|---|---|---|---|---|
| D26,112 S | | 9/1896 | Denton | |
| 629,188 A | * | 7/1899 | Diss ..................... | 16/30 |
| D32,291 S | | 2/1900 | Clark | |
| 759,834 A | * | 5/1904 | Steele .................. | 403/274 |
| 925,117 A | * | 6/1909 | Luppert ................ | 16/39 |
| 1,483,598 A | * | 2/1924 | Runne .................. | 16/18 R |
| 1,656,512 A | * | 1/1928 | Diss et al. ........... | 16/39 |
| 1,710,105 A | * | 4/1929 | Noelting .............. | 16/39 |
| 1,758,001 A | * | 5/1930 | Herold ................. | 16/39 |
| 3,068,029 A | * | 12/1962 | Schwartz ............. | 403/274 |
| 3,073,627 A | * | 1/1963 | Ritter .................. | 403/277 |
| 3,277,513 A | * | 10/1966 | Schultz, Jr. .......... | 16/31 R |
| 3,325,879 A | * | 6/1967 | Morkoski ............ | 29/891 |
| 3,429,033 A | * | 2/1969 | Callaghan ............ | 403/244 |
| 3,478,381 A | * | 11/1969 | Schultz, Jr. .......... | 16/29 |
| 3,487,495 A | * | 1/1970 | Schultz, Jr. .......... | 16/20 |
| 4,086,680 A | | 5/1978 | Kelly | |
| 4,246,772 A | * | 1/1981 | Moshnin et al. ..... | 72/370.27 |
| 4,282,629 A | | 8/1981 | Demrick et al. | |
| 4,321,068 A | * | 3/1982 | Cottrell et al. ....... | 29/515 |
| 4,411,552 A | * | 10/1983 | Lanham et al. ...... | 403/408.1 |
| 4,776,155 A | * | 10/1988 | Fox et al. ............ | 403/282 |
| 4,805,260 A | | 2/1989 | Tooth | |
| 4,921,370 A | * | 5/1990 | Handler et al. ...... | 403/234 |
| 5,052,075 A | | 10/1991 | Harris | |
| 5,470,087 A | * | 11/1995 | Mainard et al. ..... | 403/260 |
| 5,503,417 A | | 4/1996 | Murphy | |
| 5,653,306 A | * | 8/1997 | Bendickson et al. ..... | 182/15 |
| 5,934,639 A | | 8/1999 | Chiang et al. | |
| 6,118,073 A | * | 9/2000 | Lau et al. ............ | 403/282 |
| 6,428,123 B1 | | 8/2002 | Lucht et al. | |
| 6,626,404 B1 | * | 9/2003 | Kleinikel et al. .... | 16/38 |
| 6,748,623 B1 | * | 6/2004 | Tsai .................... | 16/47 |

* cited by examiner

*Primary Examiner*—Daniel P. Stodola
*Assistant Examiner*—Ernesto Garcia
(74) *Attorney, Agent, or Firm*—Leydig, Voit & Mayer, Ltd.

(57) ABSTRACT

An integrally formed caster socket is provided in a tubular framing member for a merchandising display or the like. The framing member has aligned stem receiving holes with the upper hole being on an outwardly domed frusto-conical shaped area and the lower hole is on an inwardly dimpled area of the lower frame wall. The socket configurations can be formed with simultaneous stamping or punching operations.

3 Claims, 3 Drawing Sheets

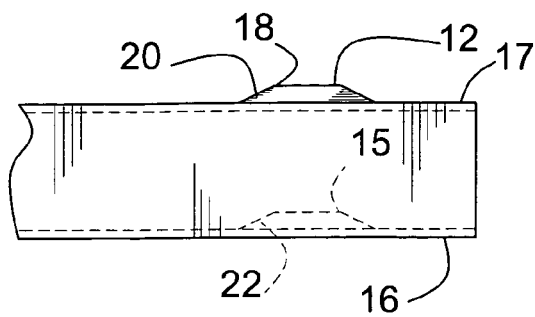
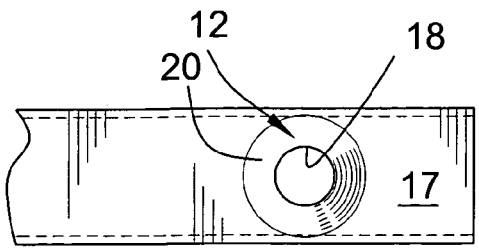
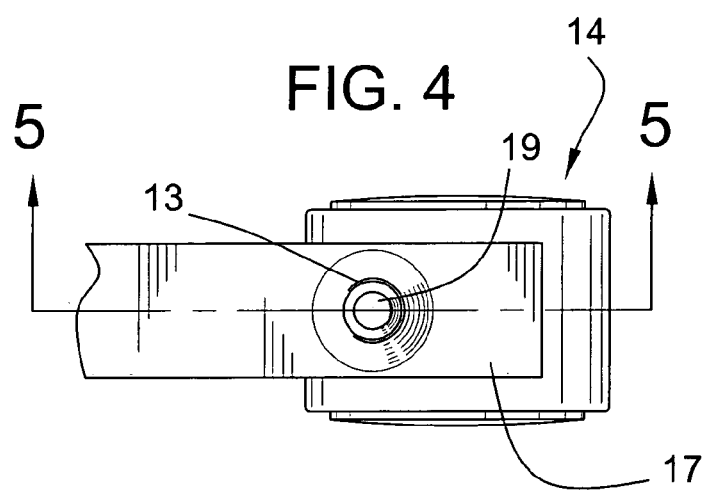
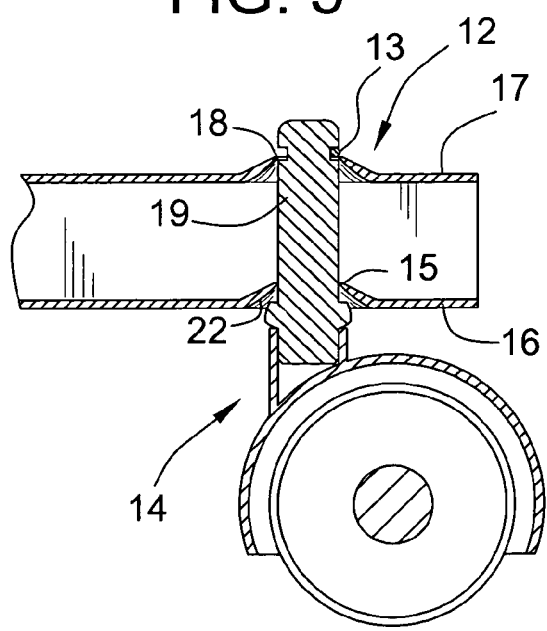
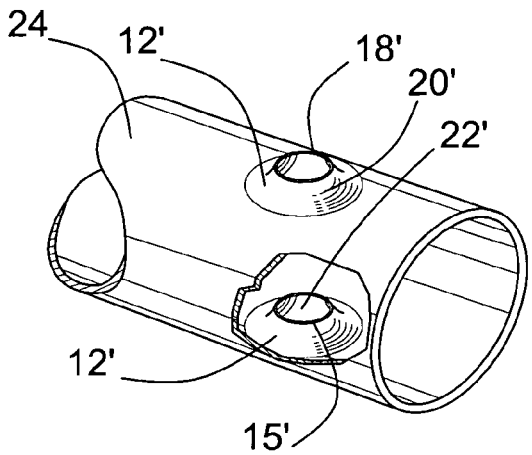

METHOD AND APPARATUS FOR SECURING A CASTER WHEEL

FIELD OF THE INVENTION

This invention pertains to the field of caster hardware, and, in particular, to friction grip stem casters for securement to merchandise displays and the like.

BACKGROUND OF THE INVENTION

Caster devices are generally secured to tubular frame members either by one-piece or multiple-piece caster sockets or by multiple-piece expansion devices. Examples are shown in U.S. Pat. Nos. 4,805,260, 4,282,629, 4,086,680, 5,052,072, Des. 32,291 and Des. 26,112. A caster-stem or bolt, extending upwardly from a caster, extends through a sleeve and is either threaded into a conical expander or a friction grip ring snaps into a groove or the top edge of the socket.

In the case of merchandising displays as well as with other desired roll-about articles, special mounts or socket devices have been necessary for attachment to frame or housing members. See, for example, U.S. Pat. Nos. 6,428,123, 5,934,639, 5,503,417 and 4,086,680.

While mounting or socket devices provide a means for securing a caster to a tubular frame member, they can be expensive and somewhat time consuming to assemble and install. Even the one-piece caster sockets, on the other hand, may be less expensive and easier to install, but they may not be as reliable or long lasting and they add more parts to deal with in packing, shipping and assembly.

What is needed is an inexpensive, easy to use and long-lasting arrangement for securing casters to merchandising or product displays.

The invention provides such a device and method of manufacturing. These and other advantages of the invention, as well as additional inventive features, will be apparent from the description of the invention provided herein.

BRIEF SUMMARY OF THE INVENTION

Generally speaking, an integrally formed caster socket on tubular frame members is provided for securing a caster to a merchandising or product display or the like.

A caster socket is integrally formed in a tubular body with upper and lower sides, the lower side has a stem receiving opening dimpled in and the upper side has an aligned stem receiving opening domed outwardly in a frusto-conical shape. The upstanding stem of a caster with a compressible friction ring can be snapped into the openings and the friction ring catches over the upper side opening edge to secure the caster.

The tubular frame member may be square, round or oval in cross-sectional shape and preferably made of metal.

It is a primary object of the present invention to provide an improved, simple and low cost arrangement for securing casters to merchandising displays and the like. In one of its important aspects, it is an object of the invention to provide a method of integrally forming a caster stem receiving socket in a tubular frame member without a need for separate parts. Further objects and advantages of the present invention will become apparent from the following description of the preferred embodiment.

BRIEF DESCRIPTION OF THE DRAWINGS

FIG. 2 is an elevational view of the formed caster socket of FIG. 1;

FIG. 3 is a top view of the formed caster socket of FIG. 2;

FIG. 4 is a top view of the formed caster socket of FIG. 2 and shown connected to a caster assembly;

FIG. 5 is a side, cross-sectional view of the formed caster socket of FIG. 4, cross section being taken along the line 5—5 and viewed in the direction of the arrows;

FIG. 6 is a perspective view of an alternative formed cross-section shaped frame partially broken away member with a formed caster socket therein.

DETAILED DESCRIPTION OF THE INVENTION

Figure 1:
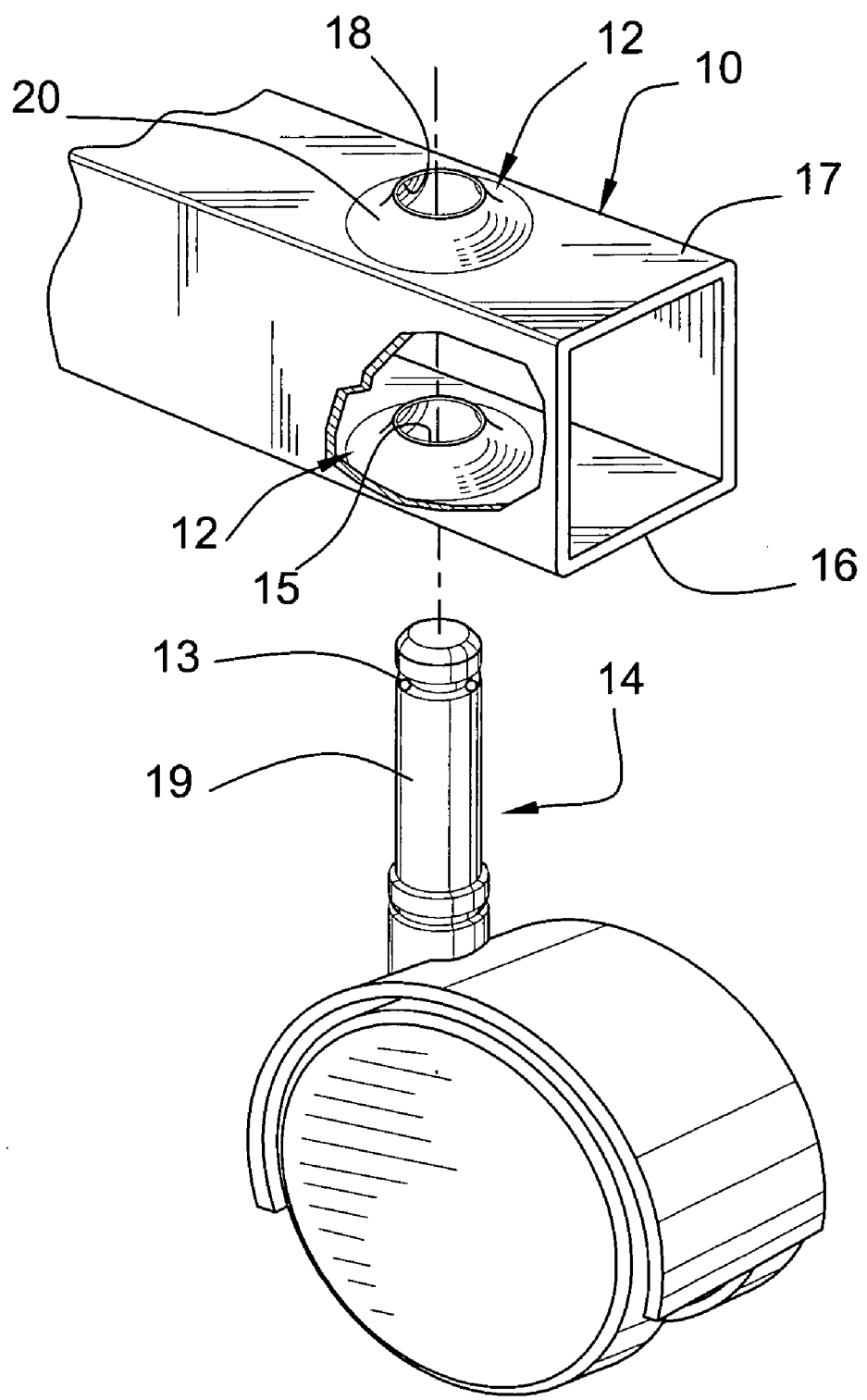
FIG. 1 is a perspective view partially broken away of an integrally-formed caster stem receiving socket on a rectangular cross section frame member in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 through 5, there is shown a portion of a rectangular shaped frame member 10 having formed friction ring grip caster socket 12 generally indicated in accordance with the preferred embodiment of the present invention. Socket 12 is an arrangement which is integrally formed and adapted for snap in insertion of a friction grip caster stem on a square cross-sectioned, tubular member such as the bottom end of a product display. An example of such a product display with a lower frame is shown in Lucht et al. U.S. Pat. No. 6,428,123. It is adapted for receiving and holding the pintle or stem having a friction ring 13 of a caster 14. Socket 12 generally includes an opening or hole 15 on the lower side wall 16 of tubular frame member 10 and an opening 18 on the upper wall 17 of the frame member 10. The openings 15, 18 are aligned and sized to receive the preselected caster pintle or stem 19 according to diameter and length. The lower hole or opening 15 is dimpled inwardly and as will be apparent to those skilled in the art, the inward dimpling may be done simultaneously with the hole 15 formation by using a stamping or punching operation for making the hole. The dimpled in surface 22 surrounding the lower side hole facilitates guiding and camming the friction ring 13 on the caster stem for entry and passage through the hole.

While the invention has been illustrated and described in detail in the drawings and foregoing description, the same is to be considered as illustrative and not restrictive in character, it being understood that only the preferred embodiment has been shown and described and that all change and modifications that come within the spirit of the invention are desired to be protected.

Figure 7:
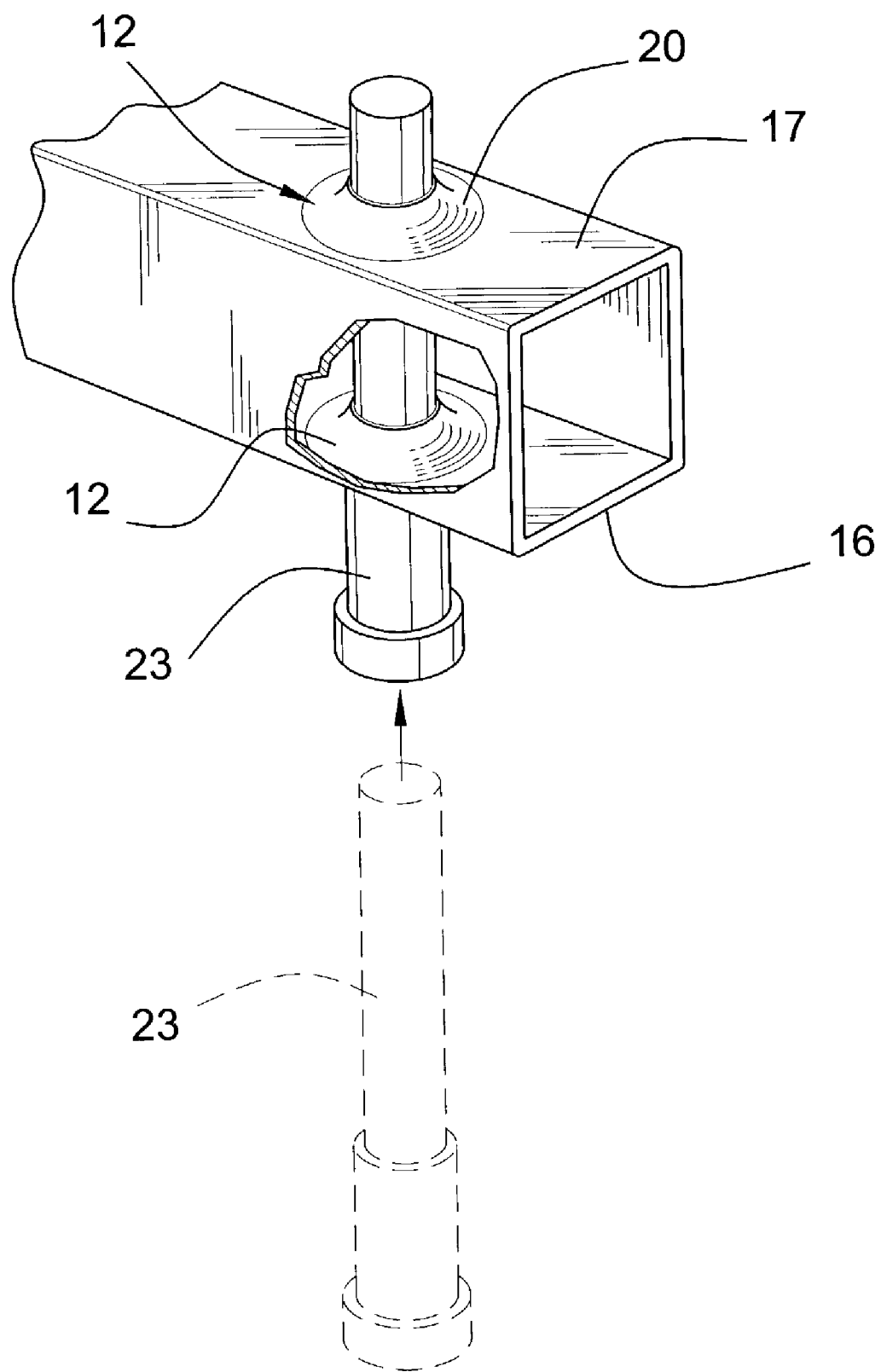
FIG. 7 is a perspective view similar to FIG. 1 showing the punch formation of the socket.

The upper opening 18 is on top of a domed upwardly-projecting frusto-conical shaped area 20 formed on the upper wall 17 of the framing member 10. Again, the use of a punching or stamping operation with punch 23 from the bottom up through the lower hole 15 to form the upper hole 18 also allows the area around the hole to flow outwardly and form the dome at the same time the hole is made as illustrated in FIG. 7.

The inner surface of the domed area also serves as a directing and camming surface for the caster stem and its compressible friction ring 13.

The caster stem can be easily snapped into the openings and the integrally formed socket holds it in place without need for a separate socket member or device.

As shown in FIG. 6, the same arrangement may be formed on a round or even oval cross-sectional shaped tubular framing member 24 as used for merchandising or product displays and the like. Since the framing members are typically made of metal, the stamping or punching operation for forming the holes readily permits simultaneous dimpling and doming of the lower and upper walls respectively surrounding the holes along with hole formation.

It will be appreciated too that the same configuration is possible with plastic material framing members either by molding or heat forming processes.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An assembly kit comprising:
    a caster having an elongated stem including a groove disposed near a distal end of the stem, and a friction ring having a substantially circular cross-section, the friction ring being disposed at least partially within the groove;
    a tubular framing member for a base having a lower wall and an upper wall, the tubular framing member defining a cavity between the lower wall and the upper wall;
    a first aperture disposed on the lower wall, the lower wall having a first substantially frusto-conical shaped area extending inward into the cavity, the first shaped area defining a perimeter of the first aperture; and
    a second aperture disposed on the upper wall such that the second aperture is substantially aligned with the first aperture relative to a vertical axis, the upper wall having a second substantially frusto-conical shaped area extending outward relative to the upper wall, the second shaped area defining a perimeter of the second aperture and the second aperture having a diameter;
    such that as the stem is moved upward toward the first aperture, the first shaped area compresses the friction ring into the groove a sufficient distance to permit the stem to pass through the first aperture, the friction ring expanding after exiting the first aperture; and
    as the stem is moved toward the second aperture, the second shaped area compresses the friction ring into the groove a sufficient distance to permit the stem to pass through the second aperture, the friction ring expanding after exiting the second aperture such that an outer diameter of the friction ring is larger than the diameter of the second aperture to prevent the stem from exiting back through the second aperture by gripping the upper wall of the tubular framing member to support the stem without the use of an insert.

2. The assembly kit as claimed in claim 1 wherein the tubular framing member is rectangular shaped in cross-section and the upper and lower walls are upper and lower sides, respectively.

3. The assembly kit as claimed in claim 1 wherein the tubular framing member is round in cross-section.

* * * * *